United States Patent

Latourette

[15] 3,663,393
[45] May 16, 1972

[54] IRRADIATION METHOD OF PREPARING ARALKYL HYDROPEROXIDES FROM HYDROCARBONS

[72] Inventor: Harold K. Latourette, Yardley, Pa.
[73] Assignee: FMC Corporation, New York, N.Y.
[22] Filed: Sept. 3, 1968
[21] Appl. No.: 757,125

[52] U.S. Cl..........................204/162 R, 204/158, 204/162 H
[51] Int. Cl. ................................................................B01j 1/10
[58] Field of Search ............................................204/162, 158

[56] References Cited

UNITED STATES PATENTS

| | | |
|---|---|---|
| 2,558,844 | 7/1951 | Gray et al. ..............................204/162 |
| 2,861,031 | 11/1958 | Heise et al. ............................204/162 |
| 2,955,996 | 10/1960 | Mashio ...................................204/162 |
| 2,973,310 | 2/1961 | Whitfield.................................204/162 |
| 3,484,353 | 11/1969 | Sharp......................................204/162 X |

*Primary Examiner*—Benjamin R. Padgett
*Attorney*—Milton Zucker, Eugene G. Seems and Robert D. Jackson

[57] ABSTRACT

Primary benzylic hydroperoxides, useful in the production of aromatic acids, aldehydes and alcohols, are obtained by oxidizing a methylated aromatic hydrocarbon with oxygen under high pressure at low temperature in the presence of a radical-forming activator.

4 Claims, No Drawings

IRRADIATION METHOD OF PREPARING ARALKYL HYDROPEROXIDES FROM HYDROCARBONS

BACKGROUND OF THE INVENTION

A. Field of the Invention

This invention relates to hydroperoxides, particularly primary benzylic hydroperoxides, and a method of producing them by the oxidation of methylated aromatic hydrocarbons.

B. Description of the Prior Art

The formation of aralkyl hydroperoxides by the autoxidation of alkylated aromatic hydrocarbons is a known reaction and numerous publications pertaining thereto have appeared in the technical literature. It is generally recognized that the reaction is of the free-radical, chain propagating type in which an alpha hydrogen atom is removed from the alkyl side chain, thereby leaving a free aralkyl radical, and this reactive specie then combines with molecular oxygen. The reaction can be depicted schematically in the following manner.

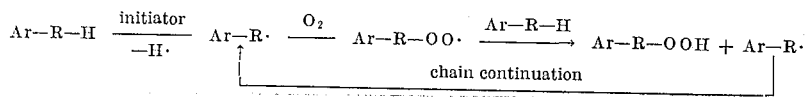

where Ar stands for an aromatic hydrocarbon group and R stands for alkylidene. Radical initiation can be promoted by radiant, chemical or thermal energy. Ideally this is a chain reaction as above depicted, in which Ar—R· is regenerated and reacted with more oxygen, etc. Although the formation of aralkyl hydroperoxide by free radical induced oxidation of alkylated aromatic hydrocarbons occurs readily where there are tertiary carbons, e.g., cumene, or even secondary carbons adjacent to the aromatic ring, such is not the situation with primary carbons as occur in methylated aromatics such as toluene or xylene. Free radicals (Ar—R·) derived from primary carbons form much more slowly and both they and their derived peroxy radicals (Ar—R—OO·) are much more reactive under the usual conditions of formation than their secondary or tertiary counterparts. Thus they enter into a multiplicity of side reactions, e.g., coupling, rearrangement, disproportionation, in addition to the desired reactions.

Since they can be converted readily into aromatic carboxylic acids, aldehydes and alcohols, primary benzylic hydroperoxides constitute potentially valuable low-cost raw materials. In the polyester field, for instance, p-phenylenedimethylene dihydroperoxide if available on an industrial scale, could be a cheap source of terephthalic acid. Thus far, however, no process has been devised capable of supplying commercial quantities of primary benzylic hydroperoxide. Manifestly, the art would benefit greatly from such a process.

SUMMARY OF THE INVENTION

I have now discovered an improved method of preparing a primary benzylic hydroperoxide by subjecting a methylated benzene, in the presence of an activator, to oxygen at superatmospheric pressure at a temperature from about −50° C. to about 40° C. for a time sufficient to form the benzylic hydroperoxide.

DESCRIPTION OF THE INVENTION AND THE PREFERRED EMBODIMENTS

In carrying out the invention, I have attained generally satisfactory results by placing the methylated hydrocarbon in an autoclave provided with a means of generating free radicals and admitting oxygen under high pressure and at the same time controlling the temperature so that it does not rise above about 40° C. The time required to form the hydroperoxide will vary with the conditions and the reactivity of the particular hydrocarbon. However, practicable time limits will generally vary from a few minutes with the more reactive species to a few hours for the more sluggish members. Progress of the reaction can be monitored by removing test samples from time to time and analyzing them for hydroperoxide content. This is conveniently carried out by iodometric titration, an assay method well known to analytical chemists.

As above stated, the temperature of the reaction should not exceed about 40° C. In the lower range, temperatures below about −50° C. are difficult to achieve and are not necessary in the practice of this invention. The pressure must be greater than atmospheric, preferably at least 50 psi, while the upper range can approach the burst limit of available laboratory equipment, i.e., about 60,000 psi.

The radical initiating source may be a quartz-tube, ultraviolet lamp situated within the autoclave chamber and constructed or protected to withstand the pressure. Alternatively, activation may be provided by high velocity electrons such as are emitted from certain types of radioactive materials.

So far as we have been able to ascertain, the process herein is applicable generally to hydrocarbons having at least one methyl group attached to an aromatic ring free of interfering or reactive substituents. Typically suitable are the methylated benzenes as illustrated by toluene, o-xylene, p-xylene, m-xylene, chloro-p-xylene, phenyl-p-xylene, mesitylene, methyl-biphenyl and the like. An especially important member is p-xylene, since the resulting dihydroperoxide formed from its oxidation can be readily converted by pyrolysis and further oxidation into terephthalic acid for use in the manufacture of polyesters. By the expression "free of interfering substituents," is meant that the aromatic ring contains only those groups which are substantially inert under the process limitations of the invention. Normally such groups will remain attached to the aromatic ring during the oxidation and appear in the same relative position in the benzylic hydroperoxide.

Although the process of the invention does not require a solvent, in some instances an inert diluent will be useful and convenient. For instance, some of the hydrocarbons, e.g., p-xylene, are solids below room temperature, and in these cases a diluent is useful in effecting dissolution or liquification of the hydrocarbon starting material. The reaction with oxygen occurs best in the liquid phase. Benzene and similarly inert liquids are examples of satisfactory solvents.

Although the benzylic hydroperoxide can be isolated, it is normally used without isolation by converting it directly into the desired product. As already pointed out, the benzylic hydroperoxides are especially useful as precursors for aromatic carboxylic acids.

Reference is now made to the following examples:

EXAMPLE 1

In an autoclave equipped with an internal ultraviolet tube, a thermometer, agitator and oxygen inlet tube, was placed a mixture of 8 parts of p-xylene and 2 parts of benzene, and oxygen admitted until the pressure reached about 3,000 psi. The reaction was maintained at the aforesaid oxygen pressure while regulating the temperature at about 0° C. until the uptake of oxygen had essentially ceased. The autoclave was then vented and the resulting p-phenylenedimethylene dihydroperoxide used immediately without further purification.

EXAMPLE 2 m-xylene was oxidized according to the procedure of Example 1, except that a temperature of 20° C. and pressure of 1,500 psi respectively were employed. The product was m-phenylenedimethylene dihydroperoxide.

EXAMPLE 3

The procedure of Example 1 was repeated with toluene while keeping the temperature at about −50° C. and the pressure at about 10,000 psi. The product was benzyl hydroperoxide.

What is claimed is:

1. A method of preparing a benzylic hydroperoxide comprising contacting a methylated aromatic hydrocarbon with oxygen under pressures from about 50 psi to about 60,000 psi and at temperatures from about −50° C. to about 40° C. in the presence of free radical producing wave energy selected from the class consisting of actinic radiation and high velocity electrons.

2. A method according to claim 1, wherein the radical promoting source is ultraviolet light.

3. The process of claim 1 wherein the methylated aromatic hydrocarbon is p-xylene.

4. The process according to claim 1 wherein the pressure is from above about 50 psig to about 60,000 psi.

* * * * *